(12) United States Patent
Ahn et al.

(10) Patent No.: US 9,908,647 B2
(45) Date of Patent: Mar. 6, 2018

(54) TRAY SEALING APPARATUS AND HEATER UNIT FOR SAME

(71) Applicant: BLT Co., Ltd., Daejeon (KR)

(72) Inventors: Joung Geun Ahn, Gyeonggi-do (KR); Yong Soo Rim, Daejeon (KR)

(73) Assignee: BLT Co., LTD., Daejeon (KR)

( * ) Notice: Subject to any disclaimer, the term of this patent is extended or adjusted under 35 U.S.C. 154(b) by 454 days.

(21) Appl. No.: 14/439,857

(22) PCT Filed: May 3, 2013

(86) PCT No.: PCT/KR2013/003860
§ 371 (c)(1),
(2) Date: Apr. 30, 2015

(87) PCT Pub. No.: WO2014/069731
PCT Pub. Date: May 8, 2014

(65) Prior Publication Data
US 2015/0259086 A1    Sep. 17, 2015

(30) Foreign Application Priority Data

Nov. 5, 2012  (KR) .......................... 10-2012-0124290

(51) Int. Cl.
*B65B 7/16*    (2006.01)
*H05B 3/40*    (2006.01)
(Continued)

(52) U.S. Cl.
CPC ............ *B65B 7/164* (2013.01); *B29C 65/224* (2013.01); *B29C 65/228* (2013.01);
(Continued)

(58) Field of Classification Search
CPC .... B65B 7/00; B65B 7/10; B65B 7/16; B65B 7/16; B65B 7/164; B65B 7/20;
(Continued)

(56) References Cited

U.S. PATENT DOCUMENTS

2003/0185948 A1*  10/2003  Garwood ................. A43B 4/16
                                                        426/392
2004/0262322 A1*  12/2004  Middleton ........ B29C 45/14336
                                                        220/675
2012/0152957 A1*   6/2012  Smith ....................... A61L 2/26
                                                        220/495.01

FOREIGN PATENT DOCUMENTS

KR        20-3041719 B       2/2004
KR    10-2009-0075582 A      7/2009
(Continued)

OTHER PUBLICATIONS

International Search Report dated Sep. 6, 2013 for WO 2014/069731 A1.

*Primary Examiner* — Jacob T Minskey
(74) *Attorney, Agent, or Firm* — Abelman, Frayne & Schwab

(57) ABSTRACT

Disclosed is a tray sealing apparatus for sealing a disposable tray with a thermoplastic sealing film. The tray sealing apparatus includes: a base body having a top surface and a tray reception cavity formed in the upper surface; and a heater unit for heating the sealing film that the sealing film adheres by fusion to the flange of the tray inserted in the tray reception cavity. The heater unit includes a principal surface with a predetermined width, and a thin strip-type electric heating element formed in a closed curve shape corresponding to the shape of the flange of the tray. When sealing the tray with the seal film by fusion, the peripheral surface of the electric heating element is disposed along the whole flange of the tray with the seal film being interposed therebetween so as to apply the heat generated by the electric heating element to the seal film.

7 Claims, 6 Drawing Sheets

(51) Int. Cl.
  *B29C 65/22* (2006.01)
  *B29C 65/78* (2006.01)
  *B29C 65/00* (2006.01)
  *B65B 7/28* (2006.01)
  B65B 51/14 (2006.01)
  B29C 65/18 (2006.01)

(52) U.S. Cl.
  CPC ........ *B29C 65/7841* (2013.01); *B29C 66/112* (2013.01); *B29C 66/131* (2013.01); *B29C 66/242* (2013.01); *B29C 66/24244* (2013.01); *B29C 66/53461* (2013.01); *B29C 66/7392* (2013.01); *B29C 66/8167* (2013.01); *B29C 66/8221* (2013.01); *B29C 66/8324* (2013.01); *B65B 7/2878* (2013.01); *H05B 3/40* (2013.01); *B29C 65/18* (2013.01); *B29C 66/71* (2013.01); *B29C 66/723* (2013.01); *B29C 66/8161* (2013.01); *B29C 66/919* (2013.01); *B29C 66/949* (2013.01); *B65B 51/148* (2013.01)

(58) Field of Classification Search
  CPC .. B65B 7/28; B65B 7/28; B65B 7/287; B65B 7/287; B65B 7/2878; B29C 65/00; B29C 65/20; B29C 65/22; B29C 65/22; B29C 65/224; B29C 65/228; B29C 65/70; B29C 65/78; B29C 65/78; B29C 65/784; B29C 65/784; B29C 65/7841; B29C 66/00; B29C 66/10; B29C 66/11; B29C 66/11; B29C 66/112; B29C 66/13; B29C 66/13; B29C 66/131; B29C 66/20; B29C 66/24; B29C 66/24; B29C 66/242; B29C 66/242; B29C 66/2424; B29C 66/2424; B29C 66/24244; B29C 66/50; B29C 66/53; B29C 66/53; B29C 66/534; B29C 66/534; B29C 66/5346; B29C 66/5346; B29C 66/53461; B29C 66/70; B29C 66/73; B29C 66/73; B29C 66/739; B29C 66/739; B29C 66/7392; B29C 66/80; B29C 66/81; B29C 66/81; B29C 66/816; B29C 66/816; B29C 66/8167; B29C 66/82; B29C 66/82; B29C 66/822; B29C 66/822; B29C 66/8221; B29C 66/83; B29C 66/83; B29C 66/832; B29C 66/832; B29C 66/8324; H05B 3/00; H05B 3/40
  See application file for complete search history.

(56) References Cited

FOREIGN PATENT DOCUMENTS

| | | |
|---|---|---|
| KR | 10-2012-0057410 A | 6/2012 |
| KR | 10-2012-0117983 A | 10/2012 |

* cited by examiner

TRAY SEALING APPARATUS AND HEATER UNIT FOR SAME

CROSS REFERENCE TO RELATED APPLICATIONS

This application is a national phase of PCT application No. PCT/KR2013/003860, filed on 3 May 2013, which claims priority from Korean patent application No. 10-2012-01242900, filed on 5 Nov. 2012, all of which are incorporated herein by reference.

TECHNICAL FIELD

The present invention relates to a tray sealing apparatus, and more particularly, to a tray sealing apparatus configured to heat a thermoplastic seal film ("seal film") so that the seal film adheres by fusion to a peripheral rim around an opening of a tray to seal the tray and a heater unit for use in such a tray sealing apparatus.

BACKGROUND

Recently, tray sealing apparatuses have been used in restaurants such as, for example, take-out restaurants and fast-food restaurants or markets so as to provide a food such as, for example, a wet food or a friable food in a state where the food is packed in a disposable tray. When the food is hermetically sealed, the food may be kept for a long time without going bad due to air. The hermetically sealed food may be conveniently kept under refrigeration, and when enjoying outdoor activities, the hermetically sealed food may be conveniently carried and stored. Accordingly, home tray sealing apparatuses for home use have been released.

FIG. 1 is a perspective view illustrating a conventional tray sealing apparatus.

Referring to FIG. 1, the tray sealing apparatus includes: a seal film supply unit provided with a plurality of rollers 101 on which a thermoplastic seal film roll RO is laid; a base body 100 provided with a tray reception hole 103 where a disposable tray T may be inserted; a cover unit 200 pivotally coupled to the top surface of the base body 100; and a heating plate 300.

The heating plate 300 is typically formed of aluminum or stainless steel and provided with an electric heating element (not illustrated) on the rear surface thereof. When an electric power is applied to the electric heating element, heat is generated from the electric heating element and the heating plate is heated to a predetermined temperature (e.g., 160° C. to 180° C.) by the heat from the electric heating element. A cutter 201 is disposed on the bottom surface of the cover unit 200 at a position between the seal film supply unit and the tray reception cavity 102.

As for the seal film, a dry laminated film of a PET (polyethylene terephthalate) film and a PP (polypropylene) film is typically used. In addition, the disposable tray T is typically formed from the PP film or the PET film and provided with a peripheral rim around the opening thereof When sealing the tray T, a user turns ON the tray sealing apparatus 10 and stands by until the heating plate 300 is heated to a predetermined temperature (e.g., 160° C. to 180° C.) by the electric heating element (not illustrated).

Then, the user inserts the tray T containing a food into the tray reception hole, and pulls the seal film from the seal film supply unit to cover the opening of the tray. Then, the cover unit 200 of the tray sealing apparatus 10 is closed, the seal film is cut in the state where the seal film covers the tray T, and the heating plate 300 mounted on the bottom surface of the cover unit 200 heats the seal film so that the seal film adheres by fusion to the peripheral rim of the tray T. Consequently, the food contained in the tray T is hermetically sealed not to contact with external air.

However, the above-described conventional tray sealing apparatus 10 includes several serious problems as follows.

First, in order to seal the tray with the seal film by fusion, the heating plate 300 should be heated to a temperature that is not lower than the melting point of the seal film. However, such heating requires a long time and a lot of energy. In addition, once heated, the heating plate retains latent heat for a long time without being quickly cooled even after the sealing is completed, thereby causing various problems as discussed below.

More specifically, the heating plate 300 typically provided in the food tray sealing apparatus has a large area and a relatively thick thickness so as to sufficiently cover the opening of a tray to be sealed and to support or incorporate the electric heating element and related components. For example, the heating plate employed in the conventional tray sealing apparatus available on the market usually has an area not less than 300 $cm^2$ (15 cm×20 cm) and a thickness not less than 1 cm. In other words, the conventional heating plate has a relatively large volume.

The conventional tray sealing apparatus provided with such a heating plate with a large volume requires a long time and consumes a lot of power in order to heat the heating plate with the large volume to a temperature required for sealing a disposable tray with a seal film by fusion, for example, about 160° C. to 180° C. at the initial sealing stage.

In practice, the power consumed by existing food tray sealing apparatuses are usually in the range of about 550 W to 1,000 W, and an AC (alternating current) power source of 110V or 220V is used for sealing such food tray sealing apparatuses. When heating the heating plates configured as described above to a temperature in the range of 160° C. to 180° C. which is used for sealing a disposable tray at the initial sealing state using the electric power as described above, a long time not less than about 5 minutes may be required.

Accordingly, in an environment where sealing should be performed repeatedly at irregular time intervals (i.e., sometimes at long intervals and sometimes at short intervals), for example, in a restaurant, the heating plate should be kept in a preheated state so as to reduce the time required for heating the heating plate. Accordingly, even if the tray sealing apparatus is not used for a relatively long period of time, the power should remain turned ON. Accordingly, energy consumption is high. Further, since the high electric power as described above is used in order to rapidly heat the heating plate, the commercial AC power source of 110V or 220V is used as it is, which may cause an electric shock to the user.

A more serious problem in the existing food tray sealing apparatuses is that, due to the large volume of the heating plates as described above, high latent heat is retained in the heating plates for a long time even after the sealing is completed and thus, a considerable length of time is required to cool the heating plates. It has been known that, in order to naturally cool the heating plates to a temperature in the non-heated state, the existing food tray sealing apparatuses require a long time which is twice or more the time required for heating the heating plate to the temperature for adhesion by fusion due to the latent heat, which may cause serious problems as described below.

First, since the high latent heat is retained for a long time in the heating plate, it is highly probable that the user may get a burn when inadvertently touch the heating plate. When such a food tray sealing apparatus is repeatedly and continuously used, for example, in a restaurant, it is required to continuously and repeatedly heat the heating element in a state where the latent heat is retained. Accordingly, a portion or area around the heating plate in the tray sealing apparatus may be overheated.

In addition, during the sealing of a tray, the tray or the seal film may be widely and excessively heated to a portion other than a sealing target portion (the peripheral rim around the opening of the tray or a portion corresponding to the peripheral rim). As a result, the tray may be crumpled or distorted or the seal film may get stuck to the heating plate so that a mark of the heating plate may be left on the top surface of the seal film. Such a deformation may give a customer an unpleasant feeling and make it difficult to stack up trays for storage. Accordingly, it may be required to perform sealing again.

Further, when the overheated condition is continued or repeated, thermal stresses are continuously and cumulatively applied to various portions or areas in the food tray sealing apparatus other than the heating plate such as, for example, a body case including the base body and the cover unit. Accordingly, for example, when the body case is fabricated using a material vulnerable to heat, it may be deformed or damaged by the thermal stresses.

Thus, it may be difficult to employ a thermoplastic resin material which is excellent moldability and inexpensive such as, for example, an acrylonitrile butadiene styrene (ABS) resin as a material for the body case or the like in the tray sealing apparatus. In order to solve such a problem, a portion to be frequently heated may be made of a metallic material such as a stainless steel material. However, it may greatly increase the weight of the entire apparatus to make it difficult to move or handle the tray sealing apparatus, while increasing the manufacturing costs. Further, such a limitation in material remarkably degrades design flexibility for the exterior appearance of the tray sealing apparatus.

Meanwhile, the conventional tray sealing apparatus remains for a long time in a state where the heating element retains high latent heat even if the power is turned OFF after sealing. In addition, the temperature of the heating plate is fluctuated depending on the number of times of sealing or whether the time interval between sealing steps is long or short when the sealing is repeatedly performed. Thus, it is difficult to properly control the temperature of the heating plate. In other words, it is difficult to secure either a suitable sealing condition when sealing the tray with a seal film by fusion or a suitable cooling condition after sealing.

Accordingly, it is difficult to ensure a suitable sealing quality with the conventional tray sealing apparatus. For example, the seal film may be excessively molten so that a suitable sealing effect may not be obtained. Also, since the heating plate is cooled slowly due to the latent heat, after sealing, the heating plate may be separated from the seal film in a state where the surface of the seal film in the sealed area is not sufficiently cured and thus, is somewhat sticky. Thus, the sealed surface of the seal film is hardly formed smoothly.

In order to solve these problems, the tray sealing apparatus may be provided with a means for controlling the temperature of the heating plate (or an electric heating element for heating the heating plate) based on the temperature of the heating plate, the heating cycle, and the cumulative number of times of sealing. However, even in an environment where the tray sealing apparatus is frequently used like a fast-food store, it is inevitable that sealing is performed at irregular intervals. Accordingly, since the level of latent heat remaining in the heating plate and the temperature of the heating plate or the surroundings thereof are varied depending on the number of times of sealing and time intervals, there are a lot of parameters to be monitored and analyzed in order to suitably control the sealing temperature and time. Accordingly, it is very difficult to prepare a means for precisely controlling the sealing condition and the cooling condition after sealing and considerable costs may be additionally required for preparing such a control means.

For example, food tray packaging apparatuses of the type as described above are disclosed in Korean Utility Model Registered No. 20-3041719 filed on Nov. 27, 2003 as Utility Model Application No. 2003-0037004 and registered on Feb. 14, 2004 in the name of Enterline Co. Ltd. ("Enterline") and Korean Patent Laid-Open Publication No. 2009-0075582 filed on Jan. 4, 2008 as Korean Patent Application No. 2008-0001497 and published on Jul. 8, 2009 in the name of GMPS Co. Ltd. ("GMPS").

Enterline includes a heating plate which is provided with a plurality of electric heating elements on the top surface thereof. An opening is formed through the central area of the heating plate and several components such as, for example, a bearing are disposed in the opening. In addition, Enterline includes an elastically flexible silicon rubber mounted on a tray abutment and configured to absorb impact applied to the tray abutment by the heating plate at the time of sealing.

However, the opening formed in the central area of the heating plate in Enterline is provided in order to secure a space for disposing several components such as the bearing, rather than in consideration of the reduction of the heating time of the heating plate.

Enterline is made to solve the problem caused as impact is applied to the tray abutment by the heating plate in which Enterline also considers the strength of the heating plate as an important factor. In other words, Enterline apparatus does not consider various problems such as, for example, a long heating time, high power consumption, and high latent heat of the heating plate in providing the opening. The bearing or the like disposed in the central opening may disturb the release of the latent heat from the heating plate.

Further, the heating plate of Enterline should have a thickness sufficient for securing a strength required in spite of providing the opening therein. Accordingly, it can be seen that Enterline also includes various problems including a significant length of time required for heating the heating plate to a predetermined temperature, high power consumption, and the delayed cooling of the heating plate due to the large volume of the heating plate.

Meanwhile, the objects of GMPS are to reduce power consumption and to suppress a user from suffering burns using a ruthenox electric heating element which is an instantaneous heating element. The ruthenox electric heating element is well-known in the related technical field and configured to enable instantaneous heating by applying a high electric power within a short time.

GMPS is configured such that plural ruthenox electric heating elements are set on the rear surface of a wide heating plate to be suitable for the sizes of various kinds of trays, respectively, and when performing sealing, one of the electric heating elements which has a size corresponding to that of a tray to be sealed may be turned ON through a selection switch.

However, in order to heat the various kinds of trays from a small tray to a large tray, it is necessary to use a wide heating plate. In addition, the heating plate should have a sufficient strength and rigidity to retain the bottom surface of the heating plate to be flat consistently. Consequently, it is inevitable that the heating plate should also be thick.

Further, in order to heat the heating plate set with the ruthenox electric heating elements as described above to a melting point of a seal film, for example, to a temperature in the range of 160° C. to 180° C. within a short time, very high electric power, for example, 1,500 W to 1,800 W, and hence a very high voltage should be applied instantaneously to a corresponding ruthenox electric heating element, which may cause a user to get a serious electric shock.

Even if the heating plate may be quickly heated by the high instantaneous voltage, after sealing, the heating plate retains latent heat for a considerable length of time without being rapidly cooled due to the wide area and thick thickness, i.e., the large volume of the heating plate. In other words, also in the case of GMPS apparatus, latent heat is retained in the heating plate for a long time after the sealing is completed and when the sealing is repeatedly performed with short time intervals, the heating plate continuously remains at a high temperature.

Accordingly, GMPS also includes most of the problems caused in Enterline as the latent heat remains for a long time in the heating plate.

That is, due to the delayed cooling of the heating plate, the user may suffer burns, sealed trays may be overheated and deformed when sealing is continuously performed, and sealed surfaces may not be formed smoothly. In addition, since the components around the heating plate may also be overheated and deformed, there is a limit in material used for fabricating the constitutional components, design flexibility for the external appearance is degraded, and a proper control of sealing conditions is difficult. It is highly probable that GMPS may cause a serious electric shock due to the instantaneous heating of the heating plate.

DESCRIPTION OF THE INVENTION

Problems to be Solved

The present invention has been made in consideration of the above-described problems in the related art and is to provide a tray sealing apparatus in which power consumption is low, a time required for sealing is short, an electric heating element is cooled within a short time such that there is very little latent heat left therein, and the electric heating element may be fabricated at low costs.

Means to Solve the Problems

According to an aspect of the present invention, there is provided a tray sealing apparatus that seals a tray having an opening and a peripheral rim with a predetermined width around the opening using a thermoplastic seal film. The tray sealing apparatus includes: a base body having a top surface and a tray reception cavity formed on the top surface and configured to receive the tray in a state where the flange of the tray is supported on the top surface; and a heater unit configured to heat the thermoplastic seal film so that the seal film adheres by fusion to the flange of the tray received in the tray reception cavity so as to hermetically seal the tray. The heater unit includes a thin strip type electric heating element having a principal surface with a predetermined width and formed in a closed curve shape corresponding to the shape of the flange of the tray. In addition, the electric heating element is configured such that, when sealing the tray with the seal film by fusion, the principal surface of the electric heating element is disposed to face the flange of the tray along the entire flange of the tray with the seal film being interposed between the principal surface and the flange of the tray and applies heat generated from the electric heating element to the seal film.

According to another aspect of the present invention, there is provided a tray sealing apparatus that seals a tray having an opening and a flange with a predetermined width around the opening. The tray sealing apparatus includes: a base body having a top surface and a tray accommodation cavity having an entry opening and formed on the top surface so as to receive the tray in a state where the flange of the tray is supported on the top surface; and a heater unit configured to heat a thermoplastic seal film so that the seal film adheres by fusion to the flange of the tray received in the tray reception cavity so as to hermetically seal the tray. The heater unit includes: a thin strip type electric heating element having a principal surface with a predetermined width and formed in a closed curve shape corresponding to the shape of the flange of the tray, and an insulation frame configured to support the electric heating element in a state where the insulation frame is in close contact with the rear surface of the electric heat element at the opposite side to the principal surface of the electric heating element. In addition, the electric heating element is configured such that, when sealing the tray with the seal film adheres by fusion, the principal surface of the electric heating element is disposed to face the flange of the tray along the entire flange of the tray with the seal film being interposed between the principal surface and the flange of the tray and applies heat generated from the electric heating element to the seal film.

According to still another aspect of the present invention, there is provided a heater unit for use in a tray sealing apparatus that seals a tray having an opening and a flange with a predetermined width around the opening using a thermoplastic seal film. The heater unit includes: a thin strip type electric heating element having a principal surface with a predetermined width and formed in a closed curve shape corresponding to the shape of the flange of the tray. The electric heating element is configured such that, when sealing the tray with the seal film by fusion, the principal surface of the electric heating element is disposed to face the flange of the tray along the entire flange of the tray with the seal film being interposed between the principal surface and the flange of the tray and applies heat generated from the electric heating element to the seal film.

According to yet another aspect of the present invention, there is provided a heater unit for use in a tray sealing apparatus that seals a tray having an opening and a peripheral rim with a predetermined width around the opening using a thermoplastic seal film. The heater unit includes: a thin strip type electric heating element having a principal surface with a predetermined width and formed in a closed curve shape corresponding to the shape of the flange of the tray, and an insulation frame configured to support the electric heating element in a state where the insulation frame is in close contact with the rear surface of the electric heat element at the opposite side to the principal surface of the electric heating element. In addition, the electric heating element is configured such that, when sealing the tray with the seal film by fusion, the principal surface of the electric heating element is disposed to face the flange of the tray along the entire flange of the tray with the seal film being interposed between the principal surface and the flange of the tray and applies heat generated from the electric heating element to the seal film.

The major features of the present invention are as follows:
i) the electric heating element has a narrow principal surface and a thickness smaller than the width of the principal surface and is formed in a closed curve shape corresponding to the peripheral rim of a tray, ii) the principal surface of the electric heating element is disposed to be face the top surface of the peripheral rim of the tray, and iii) the electric heating element is configured to directly apply heat for fusion to a seal film.

Effect of the Invention

According to the above-described features, the thin strip type electric heating element may be heated to a temperature required for the fusion of a seal film (e.g., 160° C. to 180° C.) within a very short time and quickly cooled when the power is turned OFF due to the very small volume thereof (for example, not more than 1/100,000 of those of existing heating plates). In addition, the electric heating element formed in the closed curve shape corresponding to the shape of the peripheral rim around the opening of the tray may directly heat the seal film without using a separate heating plate as in the prior art. Since the electric heating element itself is heated and has a very small volume, its power consumption is very low. In particular, since the heating plate with a large volume which has been mainly responsible for retaining latent heat in the prior art is not employed, the electric heating element may be cooled within a short time substantially without retaining latent heat after the sealing is completed.

Further, the heat for fusion may be intensively applied to a well-defined narrow region along the peripheral rim around the opening of the tray from the principal surface of the electric heating element. Further, the heat is hardly applied to a portion of the seal film other than the portion which is to adhere by fusion to the peripheral rim. Accordingly, the sealing may be performed very efficiently with very low power consumption. Further, consistent and high sealing quality may be obtained.

As described above, the present invention does not use a heating plate with a large volume and thus, may solve various problems that may be caused in connection with the heating plate. Specifically, a user may avoid suffering a burn by latent heat. In addition, it is possible to suppress a sealing target tray from being deformed by the latent heat. In addition, it is possible to suppress sealing conditions from being fluctuated depending on the number of times of sealing and time intervals of sealing due to the latent heat, unlike the conventional tray sealing apparatus provided with the heat plate. Accordingly, a separate temperature detection or control means, which has been provided to the conventional tray sealing apparatus in connection with this problem, may be omitted in the present invention.

Further, since the electric heating element may be quickly heated when the power on the electric heating element is turned ON, it is not necessary to maintain the electric heating element in a preheated state. Thus, the tray sealing apparatus is retained in the OFF state while the tray sealing apparatus is not used. Consequently, the power consumption may be further reduced.

Since the latent heat may be released within a very short time and it is not necessary to preheat the electric heating element, the sealing conditions may be substantially equal to those at the initial sealing stage. Accordingly, consistent sealing lines may be obtained even if separate complicated temperature detection and control means are provided.

Further, since most of the heat generated from the electric heating element is intensively applied to a very narrow portion to be heated and the heating element may be quickly cooled substantially without retaining latent heat, thermal stresses are not cumulatively applied to the constitutional components around the heater unit, for example, the base body or the cover unit of the tray sealing apparatus. Accordingly, structural members including the cover unit and the base body may be fabricated using a thermoplastic synthetic resin such as, for example, ABS resin, that is excellent in moldability and inexpensive. Since the structural members may be fabricated through, for example, an injection molding using such a material, the design flexibility for the external appearance may be enhanced so that a beautiful appearance for the tray sealing apparatus may be obtained at low costs.

Further, since no separate heating plate is used, the manufacturing costs may be further reduced.

DETAILED DESCRIPTION TO EXECUTE THE INVENTION

Hereinafter, several exemplary embodiments of the present invention will be described in detail with reference to the accompanying drawings. Various specific features such as constitutional elements found in the following description are provided only to help easy understanding of the present invention, but the spirit and scope of the present invention are not limited thereto. In the following description, a detailed description of known functions and configurations incorporated herein will be omitted when it may make the subject matter of the present invention rather unclear.

Meanwhile, terms indicating a direction, for example, "bottom surface," "top surface," "vertical," and "horizontal," may be used herein. However, it shall be noted that such terms are used merely for the convenience of description and unless especially defined otherwise, and they are used to mean a direction or position where a related constitutional element or portion is disposed with reference to a state where the cover unit is closed for the sealing operation of the tray sealing apparatus. Further, names of products or elements used herein shall not be interpreted as being limited to a specific use or shape. For example, the term, "tray," used herein is used to include any containers which may be sealed by a seal film attached thereto, for example, a disposable dish, a disposable cup, or a disposable bowl. Further, a container used for a product other than a food may also be included in the scope of the tray if a seal film may adhere by fusion thereto for sealing.

A tray sealing apparatus according to an exemplary embodiment of the present invention will be described with reference to FIGS. 2 and 3.

Figure 1:
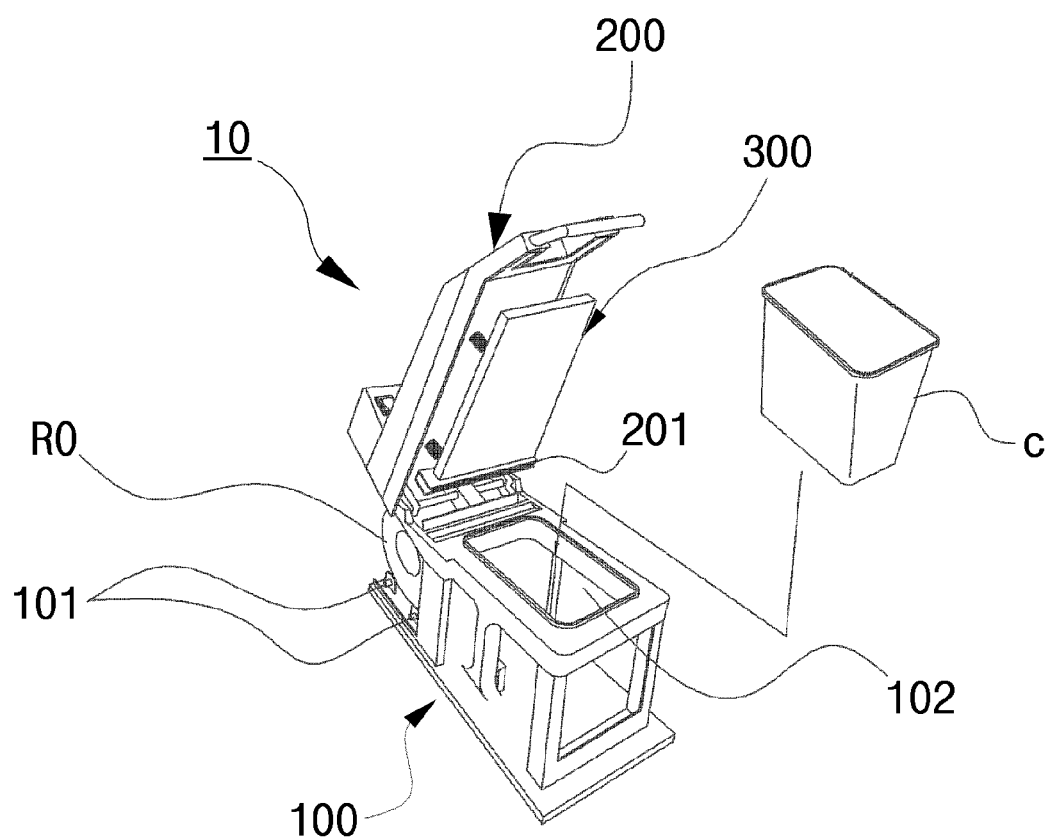
FIG. 1 is a perspective view illustrating a conventional tray sealing apparatus.
Figure 2:
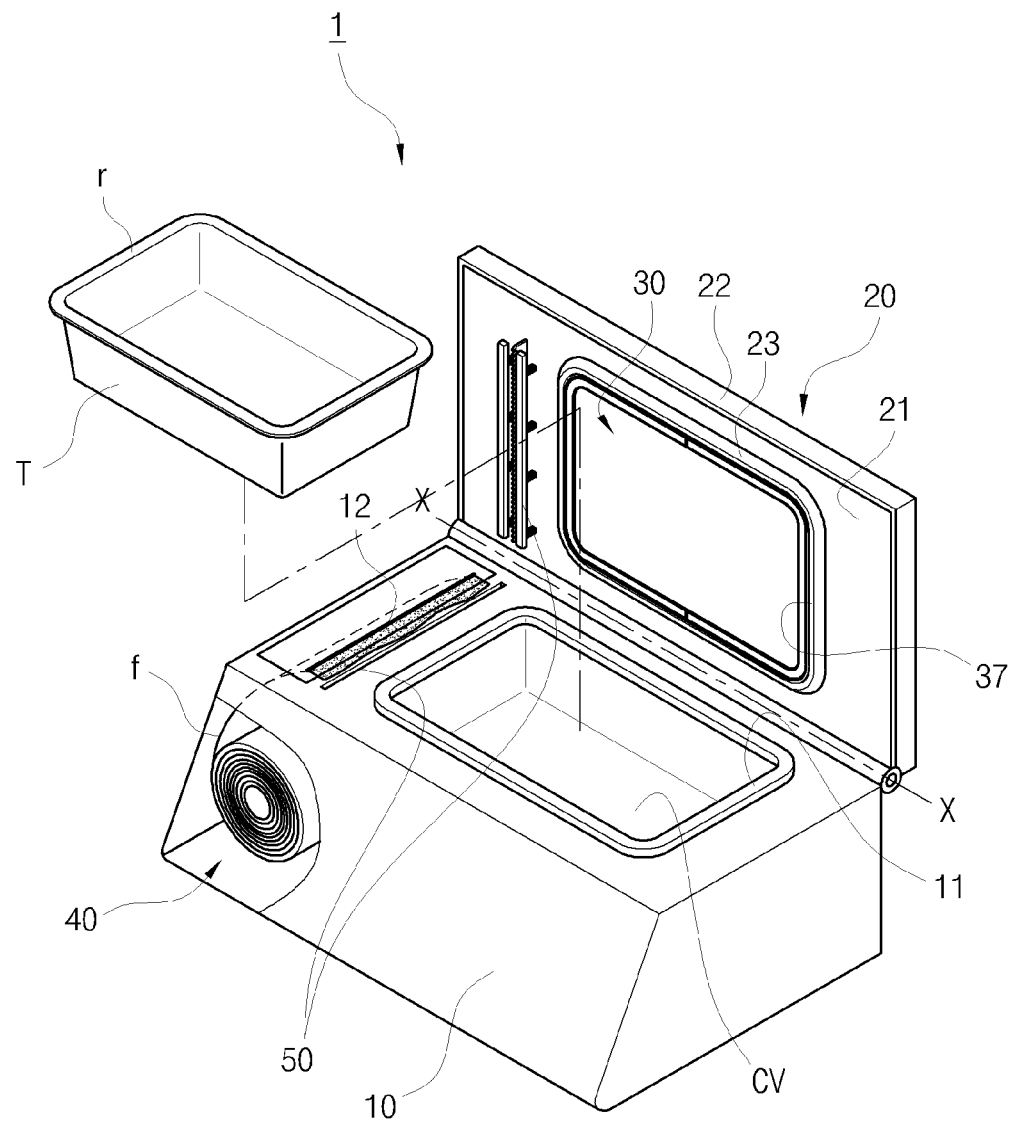
FIG. 2 is a perspective view illustrating a tray sealing apparatus according to an exemplary embodiment of the present invention.
Figure 3:
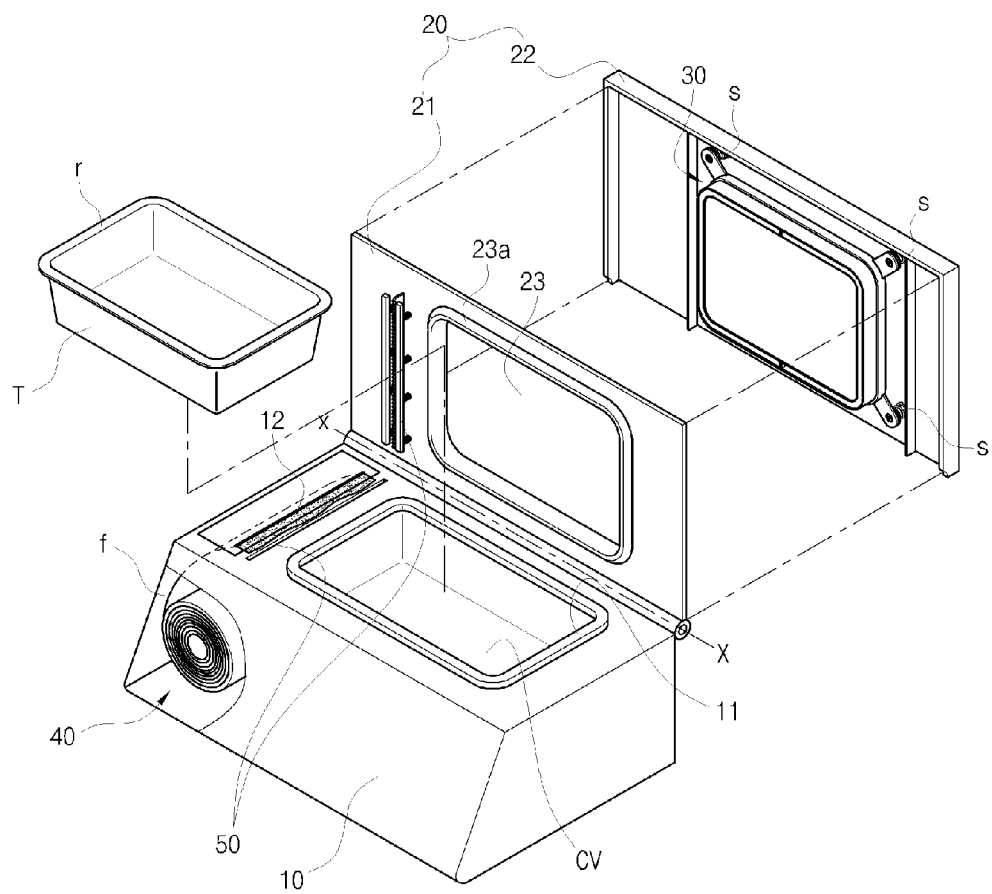
FIG. 3 is a perspective view illustrating the tray sealing apparatus illustrated in FIG. 2 in a state where the cover unit is partially disassembled.

FIG. 2 is a perspective view of a tray sealing apparatus according to an exemplary embodiment of the present invention, and FIG. 3 is an exploded perspective view of the tray sealing apparatus illustrated in FIG. 2 in a state where the cover unit is partially disassembled.

Referring to FIG. 2, the tray sealing apparatus 1 according to the exemplary embodiment of the present invention includes a base body 10, a cover unit 20 coupled to the base body 10 to be pivoted about a hinge axis X-X so as to open/close the top surface of the base body 10, and a heater unit 30 mounted on the bottom surface of the cover unit 20.

The base body 10 is provided with a seal film supply unit 40 in which a seal film roll is accommodated to supply a seal film f for sealing a sealing target tray T. Although the seal film supply unit 40 is illustrated in the drawing as being integrally formed with the base body 10, the film supply unit 40 may be provided as a unit which is separated from the base body 30.

In addition, the base body 10 is provided with a tray reception cavity CV configured to receive the tray T and a seal film seal film outlet 12. On the top surface of the base body 10, an abutment rim 11 of a predetermined height and width may be provided around the tray reception cavity CV. The tray T has a peripheral rim r with a predetermined width which is formed around the opening of the tray. Accordingly, when the tray T is inserted into the tray reception cavity CV, the peripheral rim r of the tray T is placed on the abutment rim 11 formed around the tray reception cavity CV.

The heater unit 30 mounted on the bottom surface of the cover unit 20 covers the abutment rim 11 around the tray reception cavity CV when the cover unit 20 is closed.

A cutting unit 50 may be provided between the seal film outlet 12 and the tray reception cavity CV so as to cut the seal film f when the cover unit 20 is closed.

An electric heating element 31 is provided on the bottom surface of the heater unit 30 in which the electric heating element 31 is formed in a closed curve shape corresponding to the shape of the peripheral rim r of the tray T. The electric heating element 31 and the other constitutional elements of the heater unit 30 will be described in detail below.

The heater unit 30 may be assembled to the cover unit 20 as illustrated in FIG. 3.

According to the present exemplary embodiment, the cover unit 20 may include an inner plate 21 and an outer plate 22. An opening 23 is formed in the central area of the inner plate 21 and a thick rim 23a is formed around the opening 23. The outer plate 22 is formed with a wall along each of the left, right and top edges thereof with reference to the position thereof illustrated in the drawing. The opening of the inner plate 21 may be formed to have a size and shape to be capable of accommodating the heater unit 31 with a little gap therebetween. Also, the walls of the outer plate 22 may be configured such that the inner surfaces of the walls are engaged with the left, right and top edges of the inner plate 21, respectively. On the bottom surface of the outer plate 22, one or more fastening ribs (not illustrated) may be formed. The inner plate 21 and the outer plate 23 may be fabricated through an injection molding of a plastic material such as, for example, ABS resin.

The heater unit 30 may be fastened to the bottom surface of the outer plate 22 using one or more fasteners such as, for example, screws. In such a case, a plurality of elastic elements s may be interposed between the bottom surface of the outer plate 22 and the top surface of the heater unit 30 to elastically bias the heater unit 30.

The heater unit 30 is assembled to the outer plate 22 in this manner, and the inner plate 21 is coupled to the outer plate 22 such that the heater unit 30 is received in the opening 23 of the inner plate 21. As a result, the principal surface of the heater unit 30, i.e. the surface of the heater unit 30, which is disposed to face the top surface of the base body when the cover unit 30 is closed, is exposed through the opening 23 of the inner plate 21. In this case, the principal surface of the heater unit 30 may be coplanar with or somewhat protrude from the bottom surface of the thick rim 23a around the opening 23.

The inner plate 21 is fixed to the outer plate 22 by conventional fasteners such as, for example, screws in the state where the inner plate 21 is assembled with the outer plate 22.

Thus, the inner plate 21 may serve not only to conceal the bottom surface of the outer plate 22 of the cover unit 20 around the heater unit 30 but also to suppress the heater unit 30 from being loosen or released from the outer plate 22 of the cover unit 20.

In addition, in the state illustrated in FIG. 3, the bottom edge of the inner plate 21 is hinged to the base body 10. Thus, the cover unit 20 may be pivoted in relation to the base body 10 to open/close the top surface of the base body 10. When the top surface of the base body 10 is closed by the cover unit 20, the heater unit 30 is disposed such that the electric heating element 31 may be superimposed on the abutment rim 11.

Figure 4:
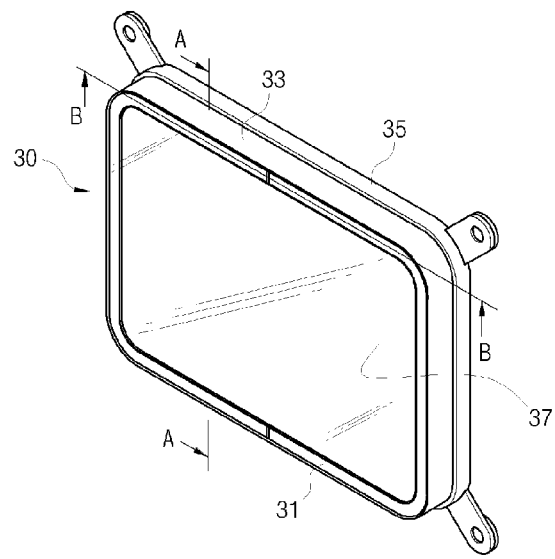
FIG. 4 is a perspective view illustrating a heater unit used for the tray sealing apparatus according to the present invention.
Figure 5:
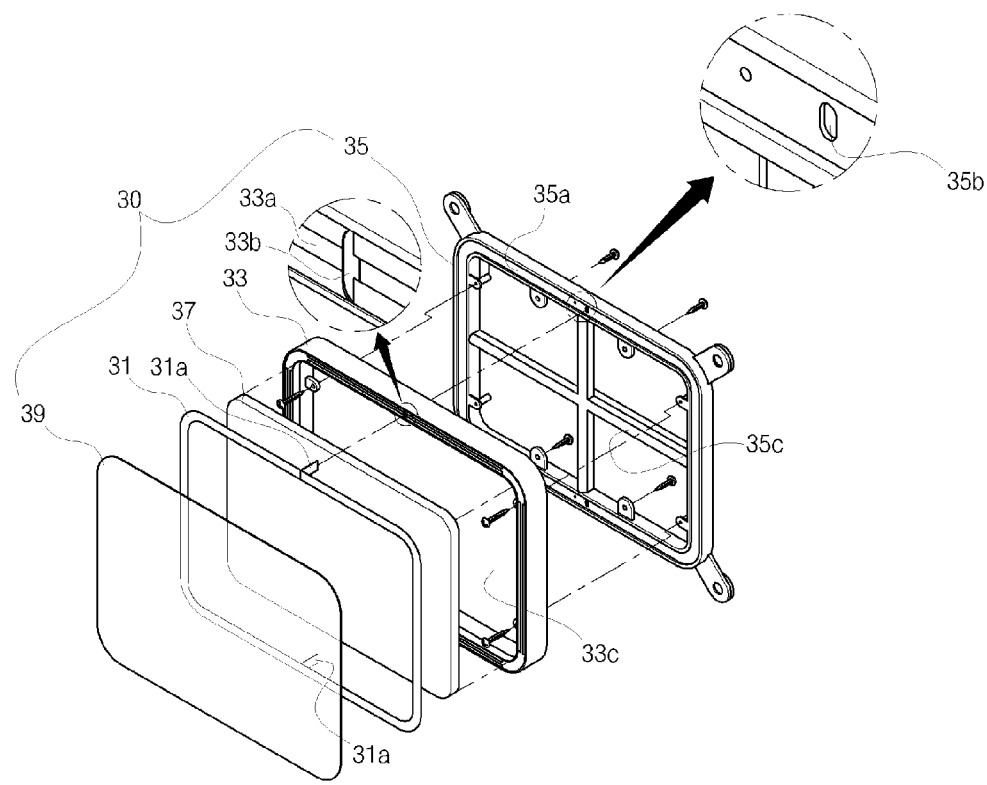
FIG. 5 is a perspective view illustrating the heater unit of FIG. 4 in a disassembled state.

Now, the heater unit 30 according to another exemplary embodiment of the present invention will be described in detail with reference to FIGS. 4 and 5. FIGS. 4 and 5 are a perspective view and an exploded perspective view of the heater unit 30 of the tray sealing apparatus 1 according to the present exemplary embodiment.

As illustrated in FIG. 2, when sealing a tray T having a substantially rectangular peripheral rim r with rounded corners, the heater unit 30 may have a size and shape to cover the peripheral rim r of the tray T. Accordingly, the heater unit 30 may be formed in a substantially rectangular shape with rounded corners and a low height as illustrated in FIG. 4. Of course, the heater unit 30 may be formed in another shape suitable for the shape of a sealing target tray, more specifically, the shape of the peripheral rim of the tray. For example, when the tray sealing apparatus is used for sealing a tray formed with a circular peripheral rim, the heater unit 30 may be formed in the circular shape corresponding to the circular peripheral rim.

As illustrated in FIGS. 4 and 5, according to the present exemplary embodiment, the heater unit 30 is provided with an electric heat element 31 configured to be electrically heated and apply heat required for causing the seal film f (see FIG. 2) to adhere by fusion to the peripheral rim r of the sealing target tray T. In addition, the heater unit 30 may be provided with an insulation frame 33 which is configured to be in close contact with and support the rear surface of the electric heating element 31. As illustrated in FIG. 7C, the electric heating element 31 may have a rectangular cross-section having a width W and a thickness t which is substantially smaller than the width W. Here, the width W corresponds to the width of the principal surface of the electric heating element 31.

The electric heating element 31 is formed in a closed curve shape corresponding to that of the peripheral rim r of the sealed tray T, and when the seal film f adheres by fusion to the tray T, the principal surface of the electric heating element 31 is disposed to face the peripheral rim r of the tray T. In other words, when the film f adheres by fusion to the tray T, the principal surface of the electric heating element 31 is disposed in the horizontal direction along the closed curve shape and the thickness portion of the electric heating element 31 is disposed in the vertical direction.

At this time, in order to suppress the heat from being applied to a portion other than the portion corresponding to the peripheral rim r of the tray T, the width W of the principal surface of the electric heating element 31 (see FIG. 7C) may be narrower than the width of the peripheral rim r of the tray T. The shape and size of the electric heating element 31 may be determined such that the electric heating element 31 is entirely superimposed on or within the width of the top surface of the peripheral rim r of the tray T.

In particular, in order to reduce the power consumption of the electric heating element 31 and to cause the seal film to quickly adhere by fusion, the electric heating element may be rapidly heated to the fusion temperature of the seal film f (for example, about 160° C. to 180° C.). In addition, in order to prevent the user from suffering a burn after the sealing is finished, it is desirable that the electric heating element can be cooled as fast as possible without retaining latent heat therein. Accordingly, the width of the principal surface of the electric heating element 31 may be narrow than that of the peripheral rim r of the tray T, and the thickness of the electric heating element 31 is substantially smaller than the width of the principal surface. For example, the thickness of the electric heating element may be about ⅕ to ¹/₁₀ of the width of the principal surface of the electric heating element 31. With respect to this, the electric heating element may be formed from a thin and narrow stripe type nichrome wire. This will be described in more detail below.

The insulation frame 33 may be formed from a heat-resistant insulation material so that it can resist heat generated from the electric heating element 31. Also, the insulation frame 33 may be formed from a material that is excellent in heat conductivity so that the electric heating element 31 may be cooled rapidly as soon as the seal film f is attached by fusion. In consideration of these properties, the insulation frame 33 may be fabricated from Bakelite or mica. Of course, other materials may be used for fabricating the insulation frame 33 as long as they are excellent in heat resistance and heat conductivity.

In order to reduce the raw material and to facilitate heat dissipation when cooling the electric heating element 31, the insulation frame 33 may be formed in a closed curve shape corresponding to that of the electric heating element 31 to have a central opening 33c as illustrated in FIG. 5. However, in order to provide a sufficient support surface for the electric heating element 31, the insulation frame 33 may have a principal surface of which the width is wider than that of the electric heating element 31. Further, when the insulation frame 33 is formed to have a channel along the rear surface thereof as shown in FIG. 6A, thereby reducing the thickness of the insulation frame 33, the heat dissipation may be further facilitated at the time of cooling the electric heating element 31.

Figure 6A:
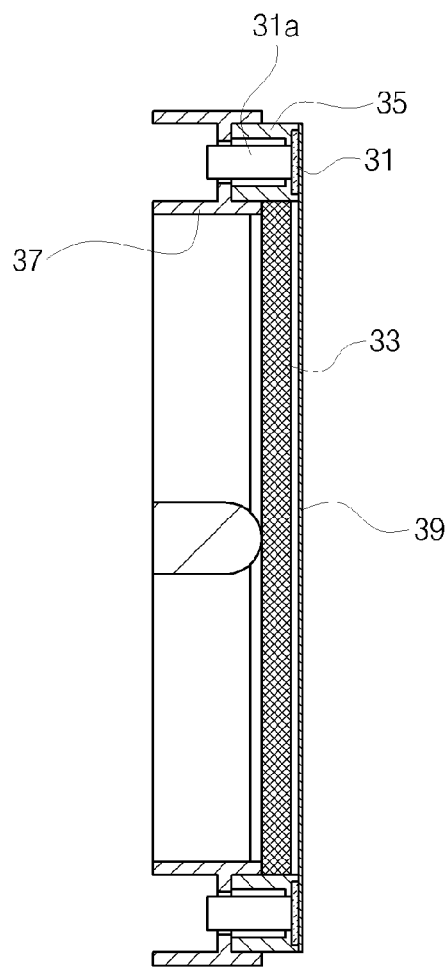
FIGS. 6A and 6B are enlarged cross-sectional views taken in the direction indicated by arrows A-A and B-B in FIG. 4, respectively.
Figure 6B:
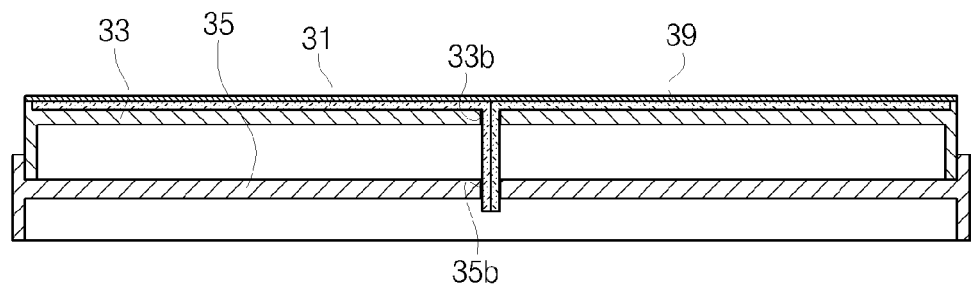

Meanwhile, as illustrated in FIG. 5 and FIGS. 6A and 6B, an electric heating element seat recess 33a extending in the peripheral direction may be formed on the principal surface of the insulation frame 33 in order to suppress the widthwise movement of the electric heating element 31. The electric heating element 31 may be seated in the electric heating element seat recess 33a. One or more terminal insertion holes 33b may be formed at predetermined positions in the electric heating element seat recess 33a, respectively. The insulation frame 33 may be fabricated through an injection molding.

When a material that is excellent in heat resistance and heat conductive such as, for example, Bakelite or mica is used as the material for the insulation frame 33 as described above, the material may be somewhat insufficient in strength and endurance. Accordingly, as illustrated in FIG. 5, a reinforcement frame 35 may be coupled to the insulation frame 33 so as to provide a reinforcement force against distortion or deformation of the insulation frame 33.

Also, the reinforcement frame 35 may be formed using a material that is relatively excellent in heat conductivity or heat dissipation property while exhibiting a strength and rigidity for providing the reinforcement force as described above.

In this viewpoint, for example, nylon 66 or glass fiber reinforced nylon 66 may be properly but not exclusively used as the material of the reinforcement frame 35. Further, the reinforcement frame 35 may also be formed in a closed curve shape corresponding to that of the electric heating element 31 to have a central opening. The reinforcement frame 35 may be formed to have a principal surface having a width which is wider than that of the insulation frame 33 so as to provide a sufficient support surface for the insulation frame 33. The reinforcement frame 35 may be fabricated through an injection molding.

In addition, as illustrated in FIG. 5, an insulation frame seat recess 35a extending in the peripheral direction may be formed on the principal surface of the reinforcement frame 35, and the insulation frame 33 may be seated in the insulation frame seat recess 35a. In addition, for example, a reinforcement rib 35c having a cross (+) shape may be formed in the central opening of the reinforcement frame 35 in order to suppress the distortion of the reinforcement frame 35. Further, in the insulation frame seat recess 35a, terminal insertion holes 35b corresponding to the terminal insertion holes 33a formed in the electric heating element 33a on the insulation frame 33 may also be formed (see, e.g., FIGS. 6A and 6B).

Figure 7A:
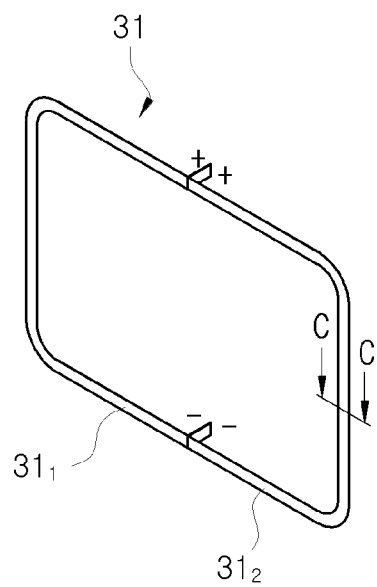
FIGS. 7A and 7B are views exemplifying electric heating elements applicable to the heater unit according to the present invention.
Figure 7B:
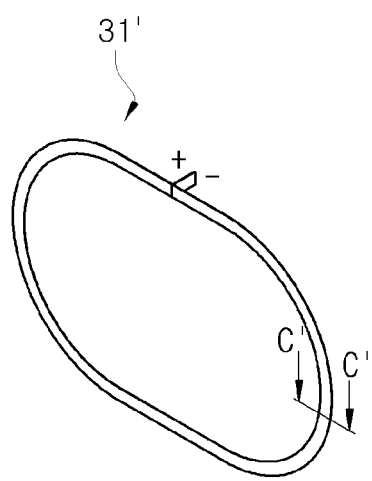
Figure 7C:
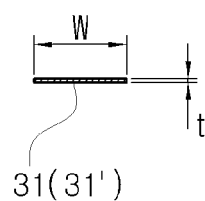
FIG. 7C is a cross-sectional view of the electric heating elements taken in the direction indicated by arrows C-C in FIG. 7A and arrows C'-C' in FIG. 7B.

Meanwhile, FIGS. 7A and 7B exemplify electric heating elements that may be applied to the heater unit of the present invention. FIG. 7C illustrates a cross-sectional view taken in the direction indicated by arrows C-C in FIG. 6A and arrows C'-C' in FIG. 6B.

As described above, the electric heating element 31 is formed in a closed curve shape corresponding to the shape of the peripheral rim r of a sealing target tray T (see, e.g., FIGS. 2 and 3). As illustrated in FIGS. 7A and 7B, the closed curve shape may be variously formed depending on the shape of the peripheral rim r of the tray T to be sealed. Of course, the electric heating element 31 may be formed in any closed curve shape other than those illustrated in these drawings according to the shape of the peripheral rim of the sealing target tray.

According to an exemplary embodiment, the electric heating element 31 may be formed by bending a linear thin strip type electric heating wire such that the principal surface of the electric heating wire forms the principal surface of the electric heating element 31 that emits the heat for fusion when the tray is sealed by a sealing film.

For example, as illustrated in FIG. 7A, the electric heating element 31 may be divided into two half-sections $31_1$, $31_2$. In addition, each of the half-sections $31_1$ and $31_2$ may be formed by bending an electric heating wire in a shape corresponding to that of each of the half-sections $31_1$, $31_2$ (e.g., a U-shape) such that the principal surface of the electric heating wire is arranged horizontally and the thickness surfaces are arranged vertically, and then bending rearward the opposite ends of the electric heating wire of each half-section to be substantially perpendicular to the principal surface of the electric heating wire. Thereafter, the opposite bent end portions of one half-section are abutted and bonded to the opposite bent end portions of the other half-section, respectively. In this manner, the electric heating element 31 of the closed curve shape may be easily formed. In this case, the bent and bonded end portions may serve as electric connection terminals. Accordingly, the bent end portions at each bonded end portion may be connected to the same electric polarity in order to avoid an overheating phenomenon at the bonded end part.

Alternatively, the electric heating element 31 may be formed by bending a single electric heating wire in a desired closed curve shape and then bending and bonding the opposite end portions of the electric heating wire to each other. The end portions 31a may be bonded using a heat-resistant and electrically conductive adhesive. As illustrate in FIG. 7C, the electric heating element formed in the closed curve shape has a rectangular cross-section in which the principal surface has a narrow width W and the thickness t of the electric heating element is very thin as compared to the width W. Consequently, it will be appreciated that the principal surface of the electric heating element 31 serves as a heat emitting surface for heating the seal film along the periphery of the closed curve shape.

A fine void may be formed between the bent and bonded end portions. In such a case, the void may be filled with a heat-resistant material such as, for example, a silicon hot-melt so that the entire principal surface of the electric heating element 31 forms a substantially flat surface.

As for the strip type electric heating wire, for example, a nichrome electric heating wire having a width of about 1.6 mm and a thickness of about 0.18 mm and a nichrome heating wire having a width of about 2.0 mm and a thickness of about 0.20 mm which are commercially available may be used. A person ordinarily skilled in the art may appreciate that the nichrome electric heating wires as described above may be rapidly heated to a predetermined temperature by a low voltage DC power, and may be rapidly cooled within a short time after the power is cut off since the thickness and width are very small.

As the thickness or length of a nichrome electric heating wire is increased, the electric resistance and hence the power consumption are increased. In connection with this, the inventors of the present application conducted tests in which the inventors prepared specimens for the electric heating element in the shape illustrated in FIG. 7A using the two types of nichrome electric heating wires as described above. The circumference length of the specimens was about 70 cm. The inventors connected the specimens to a DC power source (rated power of 240 W and working voltage of 12V) and measured a time required for heating the specimens to about 180° C. The circumference length of the specimens was determined as 70 cm in consideration of the fact that the circumference length of the peripheral rims of trays to be sealed by the inventive tray sealing apparatus may be approximately 70 cm.

In the tests, the commercial 220V AC power was converted to 12V DC power using an SMPS (Switching Mode Power Supply) and the 12V DC power was used for the working voltage. The SMPS is a well-known AC-DC power converter which is frequently used in a semiconductor manufacturing equipment or the like. In the tests, it was confirmed that the time required for initially heating the electric heating elements to about 180° C. were about 7 to 9 seconds.

In addition, the inventors prepared a heater unit and a tray sealing apparatus configured as described above using the electric heating elements and performed tests for confirming the sealing performance thereof. In the tests, the 12V DC voltage (rated power: 240 W) was used and conventional seal films and disposable trays used in the existing food tray sealing apparatuses were used. The testing method and results will be discussed in detail below.

Although it has been described above that the electric heating element is fabricated by bending a linear strip type electric heating wire in a closed curve shape corresponding to the shape of the peripheral rim of a tray to be sealed, the scope of the present invention is not limited to such a fabrication method. That is, for example, if a thin strip type electric heating element of a closed curve shape corresponding to the shape of the peripheral rim of a tray is directly used as a heat source for heating a seal film, it belongs to the spirit and scope of the present invention regardless of the fabrication method thereof Now, an assembling method of the heater unit 30 according to an exemplary embodiment of the present invention will be described with reference to FIGS. 4 and 5.

First, the insulation frame 33 is seated on the principal surface of the reinforcement frame 35, more specifically in the insulation frame seat recess 35a, and then the insulation frame 33 is fixed to the reinforcement frame 35 using fasteners such as, for example, screws. Then, the electric heating element 31 is seated on the principal surface of the insulation frame 33, more specifically, along the electric heating element seat recess 33a, and the bent and bonded end portions 31a of the electric heating element 31 are inserted into the terminal insertion holes 33b, 35b which are formed in the electric heating element seat recess 33a and the insulation frame seat recess 35a, respectively. The end portions are connected to a power source. In addition, the electric heating element 31 may be attached to the bottom surface of the electric heating element seat recess 33a using a heat-resistant adhesive.

In the assembled state as described above, the closure plate 37 may be fitted in the central opening 33c of the insulation frame 33 to close the opening 33c and to suppress the reinforcement rib of the reinforcement frame 35 coupled to the rear surface of the insulation frame from being exposed to the outside.

Then, a thin adhesive sheet 39 may be attached over the entire exposed surfaces of the electric heating element 31, the closure plate 37, and the insulation frame 33 to conceal the electric heating element 31, the closure plate 37, and the insulation frame 33 not to be exposed to the outside. The adhesive sheet 39 serves as a finishing material for the heater unit 30 and may fix the electric heating element 31 to the insulation frame 33 more stably. The adhesive sheet 39 is always retained in the state in which it is in close contact with the electric heating element 31 and comes into contact with a seal film at the time of sealing. Thus, the adhesive sheet 39 may be formed of a material which is excellent in heat resistance, wear resistance, and heat conductivity.

The heater unit 30 assembled as described above may be mounted on the cover unit 20, more specifically, on the bottom surface of the outer plate 22 of the cover unit 20 using fasteners such as, for example, screws. As described above, elastic members such as, for example, springs s may be interposed between the heater unit 30 and the outer plate 22 of the cover unit 20 to elastically bias the heater unit 30 so that, when sealing a tray with a seal film, the heater unit 30, more specifically, the electric heating element 31 may be pressed against the tray T.

The heater unit 30 assembled as described above takes a modular structure which may be detachably attached to the tray sealing apparatus. Accordingly, when the heater unit of the tray sealing apparatus is damaged or destroyed, the user may simply replace it with a new one.

Now, the functional actions of the tray sealing apparatus of the present invention configured as described above will be described.

First, a sealing target tray T is inserted into the tray reception cavity CV formed on the top surface of the base body 10, and a seal film f is drawn out from the seal film supply unit to cover the tray T.

Thereafter, the cover unit 20 is pivoted to close the top surface of the base body 10. Then, the seal film f is cut by the cutting unit 50, of which the components are provided on the top surface of the base body 10 and the bottom surface of the cover unit 20, and the seal film f is sandwiched between the peripheral rim r of the tray T and the elastically biased heater unit 30, more specifically, the electric heating element 31.

Thereafter, when the electric power is applied to the heater unit 30, more specifically, to the electric heating element 31, the electric heating element 31 heats the seal film f to a predetermined temperature higher than the melting point of the seal film f and presses the seal film f against the peripheral rim r of the tray T so that the seal film f is hermetically attached to the tray T along the peripheral rim r of the tray T.

Meanwhile, the inventors performed tests using a tray sealing apparatus configured as described above to confirm whether there are any problems including latent heat. The conditions used in the tests were as follows.

i) Rated power: 240 W (12V DC)

ii) Material of the electric heating element: a nichrome electric heating wire of a length of about 74 cm, a width of about 0.16 cm, and a thickness of about 0.018 cm iii) Seal film: a dry laminated film of PET film and PP film (melting point: about 160° C.)

iv) Sealing target tray: disposable trays formed of a PP material v) Lab. temperature: about 22° C.

vi) Used thermometer: IR thermometer (Model Name: R Raynger available from Reytek Co. Ltd.)

vii) Material of heater unit: an insulation frame made of Bakelite, a reinforcement frame made of nylon 66, and an adhesive sheet made of a silicon adhesive sheet.

viii) Material of tray sealing apparatus: structural components of cover unit and base body fabricated by injection-molding ABS resin.

In the tests, the length of sealing time at each sealing step was set to 10 sec. The tray sealing apparatus was set to be automatically turned OFF after 10 seconds passes after turned ON, and the time interval between sealing steps was set to 20 sec. During each time interval between the sealing steps, the tray sealing apparatus was retained in the OFF state. Just after the sealing time (10 sec) have passed from the starting of each sealing step, the cover unit was opened and the temperature of the electric heating element was measured. Also, the temperature of the electric heating element was also measured after 20 seconds has passed after the cover unit was opened, i.e., just before the tray sealing apparatus was turned ON for the next sealing. Also the state of each of the sealing lines of the seal films was visually inspected.

According to the above-described procedures, the tests were repeatedly performed three times. In each test, 50 trays were sealed.

In the tests, it was found that the temperature of the electric heating element just after each sealing step gradually increased from about 38° C. at the first sealing to about 48° C. just after the seventh or eighth sealing step. However, after the seventh or eighth sealing step, the temperature of the electric heating element was maintained in the range of about 42° C. to about 48° C. regardless of the sealing times. In addition, it was also found that the temperature of the electric heating element after 20 seconds from the end of each sealing step increased from about 27° C. after the first sealing step to 36° C. after sixth to ninth sealing steps. Thereafter, the temperature of the electric heating element was maintained substantially constantly at about 36° C.

Although the temperature variation at the electric heating element itself was as described above, it was found that the temperatures measured just after each sealing step at several points adjacent to the heater unit on each of the cover unit and base body did not exceed about 36° C.

In the tests, an insufficient or excessive fusion of the seal films and the deformation of the trays were not detected. Rather, it was found that each sealing line is smoothly formed on the seal films with a width similar to the width of the electric heating element.

Through the above-described tests, it was confirmed that the electric heating element is rapidly cooled while the cover unit is being opened and most of the heat generated from the electric heating element is used to heat the seal films to adhere by fusion, so that the transfer rate of the heat generated from the electric heating element to the portions adjacent to the heater unit is very low. It was also found that the abutment rim around the tray reception cavity facing the electric heating element is not substantially overheated during the sealing. It is believed that this is because the seal film and the peripheral rim of the tray may provide a heat insulation effect that suppresses the heat transfer from the electric heating element to the abutment rim.

The present inventors also performed tests for a conventional tray sealing apparatus having a heating plate to confirm the problems including latent heat. The tray sealing apparatus used in the tests was as follows.

i) Product: Model Name M1 available from Impack Co. Ltd.

ii) Rated power: 550 W (AC 220V)

iii) Lab. temperature: about 22° C.

In the conventional tray sealing apparatus, the temperature of the heating plate was increased to about 187° C. after about six minutes have passed after the tray sealing apparatus was turned ON, and the temperature was not increased over 187° C. even if the tray sealing apparatus remained turned ON. It is believed that the temperature was controlled by a temperature control circuit provided in the tray sealing apparatus.

The temperature measured from the heating plate was about 80° C. after 10 minutes have passed after the tray sealing apparatus was turned OFF, about 60° C. to 62° C. after 15 minutes have passed after the tray sealing apparatus was turned OFF, and about 50° C. after 20 minutes have passed after the tray sealing apparatus was turned OFF. In other words, the Impack tray sealing apparatus retains high latent heat in the heating plate for a long time after the power is turned OFF and thus, it is highly probable that the user may suffer a burn. The present invention solves this problem by using a thin and narrow strip type electric heating element formed in a closed curve shape without using such a heating plate.

The inventors performed sealing using the Impack tray sealing apparatus in the state where the heating plate has been heated to 187° C. As a result, when sealing was performed for 10 sec, disposable trays were deformed. When sealing was performed for 5 sec, marks of the heating plate left an impression on the seal films attached to the trays. When the sealing was performed for 3 seconds, these problems were not observed. With the Impack tray sealing apparatus, it is difficult for a user to obtain a properly sealed state unless the user is skilled in sealing. According to the present invention, since the electric heating element may be rapidly heated and cooled, the sealing conditions may be substantially constant at every sealing time. Thus, consistent and good sealing lines may be obtained, for example, merely by setting the duration of the ON state of the tray sealing apparatus.

For example, a conventional power cut-off timer may be provided in a power supply circuit of the inventive tray sealing apparatus so as to cut off the circuit after a predetermined length of time has passed. Or, the power supply circuit may be configured to be automatically connected when the user closes the cover unit and to be automatically cut off when the user opens the cover unit. Then, the user's convenience may be further enhanced. Since such a configuration of the power supply circuit may be readily conceived by a person skilled in the art, additional descriptions thereon will be omitted.

The Impack tray sealing apparatus requires a long time (about 6 minutes) for initial heating for sealing and is configured to remain turned ON. In order to maintain the heated state, the tray sealing apparatus is provided with a separate temperature control circuit, which may increase the manufacturing costs. In addition, the power consumption of the Impack tray sealing apparatus is higher than twice the power consumption of the tray sealing apparatus of the present invention and thus, may consume considerable energy. Further, due to the high AC voltage of 220V used in the Impack tray sealing apparatus, the user may get an electric shock.

Further, since the power remains continuously turned ON so as to keep the heating plate in the state suitable for sealing, the portions of the tray sealing apparatus other than the heating plate may continuously receive thermal stresses, thereby being overheated. Accordingly, the user is more likely to suffer a burn and unnecessary power consumption is also high. Further, the tray sealing apparatus should be entirely fabricated using a heat-resistant material in order to endure such overheating. This may increase the material costs and limit design flexibility for the external appearance of the tray sealing apparatus.

According to the present invention, since the electric heating element may be heated and cooled within a very short time, the tray sealing apparatus may remain turned OFF while sealing is not performed. Accordingly, the user may avoid suffering burns and power consumption is very low. Further, since most of the heat generated by the electric heating element is used for sealing the tray with a seal film by fusion and heat stresses applied to a portion of the tray sealing apparatus other than the electric heating element are very small, most of the structural components of the tray sealing apparatus other than the heater unit may be fabricated using a synthetic resin such as, for example, ABS resin that is excellent in moldability and inexpensive. Accordingly, the material costs and manufacturing costs may be reduced, and the design flexibility for the external appearance may be enhanced.

There may be a limit in terms of a space when the Impack tray sealing apparatus is installed since the heating plate may continuously remain in the heated state. When the heating plate and the other portions of the tray sealing apparatus are continuously heated, the tray sealing apparatus may increase the temperature of the space in which the tray sealing apparatus is used. Accordingly, when the Impack tray sealing apparatus is used, for example, in a fast-food restaurant, it may be necessary to provide a separate tray sealing apparatus installation space, which may increase the working line of sales clerks. Consequently, this may be the cause of increasing the space cost and labor cost. According to the present invention, since the tray sealing apparatus is not overheated as confirmed through the above-described tests, it may be installed and conveniently used at or adjacent to an area where sales clerks usually work.

That is, by forming a thin strip type electric heating element in a closed curve shape corresponding to a peripheral rim of a sealing target tray without providing a heating plate, the present invention may obtain various effects summarized as follows:

i) power consumption may be significantly reduced, ii) risk of a burn and an electric shock may be avoid, iii) a non-skilled person may easily perform sealing and obtain high quality and consistent sealing lines, iv) deformation of sealed trays by latent heat may not be suppressed, v) most of the structural components of the tray sealing apparatus may be fabricated using an inexpensive synthetic resin such as, for example, ABS resin, thereby reducing material costs, vi) design flexibility for the external appearance may be enhanced, and vii) the product may be easily and conveniently handled.

While specific exemplary embodiments have been described with reference in the foregoing detailed description of the present invention, it will be obvious to a person ordinarily skilled in the art that various changes may be made thereto without departing from the scope of the present invention as defined by the appended claims.

What is claimed is:

1. A tray sealing apparatus that seals a tray having an opening and a peripheral rim with a predetermined width around the opening using a thermoplastic seal film, the tray sealing apparatus comprising:
   a base body having a top surface and a tray reception cavity formed on the top surface and configured to receive the tray in a state where the flange of the tray is supported on the top surface;
   a cover unit pivotally connected to the base body to open/close the top surface of the base body, and when closed, disposed horizontally to face the top surface of the base body; and
   a heater unit coupled to a bottom surface of the cover unit, the heater unit being configured to heat the thermoplastic seal film so that the seal film adheres by fusion to the flange of the tray received in the tray reception cavity so as to hermetically seal the tray,
   wherein the heater unit includes a thin strip type electric heating element having a principal surface with a predetermined width and formed in a closed curve shape corresponding to the shape of the flange of the tray, and the electric heating element is formed by bending a linear thin strip type electric heating wire that has a principal surface of a width corresponding to that of the principal surface of the electric heating element in such a manner that the principal surface of the electric heating wire forms the principal surface of the electric heating element after bending, the electric heating element being configured such that, when sealing the tray with the seal film by fusion, the principal surface of the electric heating element is disposed to face the flange of the tray along the entire flange of the tray with the seal film being interposed between the principal surface and the flange of the tray and applies heat generated from the electric heating element to the seal film.

2. The tray sealing apparatus as claimed in claim 1, wherein the electric heating element is formed by bending two electric heating wire sections so that each of the electric heating wire sections has a shape corresponding to a half of the closed curve shape and then bonding opposite ends of the electric heating wire sections to each other.

3. The tray sealing apparatus as claimed in claim 2, wherein each bent electric heating wire section is bent rearward at the opposite ends thereof to be substantially perpendicular to the principal surface of the electric heating wire section, and the opposite bent end portions of one electric heating wire section are abutted and bonded to the opposite bent end portions of the other electric heating wire section, respectively.

4. The tray sealing apparatus as claimed in claim 3, wherein a void is formed between the opposite bent end portions of the electric heating wire sections after being bonded to each other, and is filled with heat-resistant filler.

5. The tray sealing apparatus as claimed in claim 1, wherein the linear thin strip type electric heating wire is a nichrome wire.

6. The tray sealing apparatus as claimed in claim 1, wherein the electric heating element has a rectangular cross-section, the width of the principal surface of the electric heating element is in the range of 1.6 mm to 2.0 mm, and the thickness of the electric heating element is in the range of 0.18 mm to 0.20 mm.

7. The tray sealing apparatus as claimed in claim 1, wherein the heater unit further includes an insulation frame formed of a heat-resistant and heat-conductive material, and the electric heating element is supported by the insulation frame in a state where the rear surface of the elastic heating element opposite to the principal surface is in close contact with the insulation frame.

* * * * *